United States Patent
Upton et al.

[11] Patent Number: 6,138,225
[45] Date of Patent: Oct. 24, 2000

[54] ADDRESS TRANSLATION SYSTEM HAVING FIRST AND SECOND TRANSLATION LOOK ASIDE BUFFERS

[75] Inventors: Michael Upton, Portland; Gregory Mont Thornton, Beaverton; Bryon Conley, Aloha, all of Oreg.

[73] Assignee: Intel Corporation, Santa Clara, Calif.

[21] Appl. No.: 08/998,203

[22] Filed: Dec. 24, 1997

[51] Int. Cl.[7] ............................................ G06F 12/10
[52] U.S. Cl. ........................ 711/207; 711/3; 711/128; 711/129; 711/144; 711/145; 711/137; 711/169
[58] Field of Search ............................ 711/3, 204, 206, 711/207, 128, 129, 144, 145, 137, 169

[56] References Cited

U.S. PATENT DOCUMENTS

| | | | |
|---|---|---|---|
| 5,179,674 | 1/1993 | Williams et al. ....................... | 711/204 |
| 5,412,787 | 5/1995 | Forsyth et al. .......................... | 711/207 |
| 5,900,022 | 5/1999 | Kranich .................................... | 711/205 |
| 5,938,761 | 8/1999 | Patel et al. .............................. | 712/238 |
| 5,956,752 | 9/1999 | Mathews ................................. | 711/204 |
| 6,065,091 | 5/2000 | Green ....................................... | 711/3 |

*Primary Examiner*—Hiep T. Nguyen
*Attorney, Agent, or Firm*—Leo V. Novakoski

[57] ABSTRACT

A memory system for providing rapid access to cached data includes a cache, a first TLB that stores address translation entries in a truncated form for fast access to data in the cache, and a second TLB that stores full address translation entries for accurate translation. The first TLB generates the tentative physical address quickly and initiates access to the cache using the tentative physical address. A way identified using the tentative physical address is read out of the cache and compared with a validated physical address provided by the second TLB. The initiated access is allowed to complete when the tentative and validated physical addresses match.

29 Claims, 6 Drawing Sheets

6,138,225

ADDRESS TRANSLATION SYSTEM HAVING FIRST AND SECOND TRANSLATION LOOK ASIDE BUFFERS

BACKGROUND OF THE INVENTION

1. Technical Field

The present invention relates to the field of address translation, and in particular, to systems for translating between linear or logical addresses and physical addresses.

2. Background Art

The frequencies at which central processing units (CPUs) operate have increased significantly in the last few years. It is expected that processors operating in the gigahertz range of frequencies will be available in the near future. However, the computing power of a processor is not determined solely by the frequency at which its core components operate. CPUs operate on data according to instructions, and both the data and instructions (hereafter "data") must be provided to the CPU from various memory structures. The full computing power of a CPU is available only when data can be supplied to the processor at speeds sufficient to keep the CPU busy at its operating frequency.

A number of strategies have been developed to reduce or eliminate bottlenecks in the data paths between the CPU and its various memory devices. These strategies include the use of one or more caches to maintain data and instructions in close proximity to the processor core. High performance CPUs typically have at least one cache, e.g. an L0 cache, located on the same chip as the processor core. L0 caches tend to be relatively small to provide rapid access to the data they store and to limit the amount of the CPU chip devoted to data storage.

In addition to L0 caches, many processor include higher level caches (L1, L2 . . . ), one or more of which may be located on the CPU chip as well. Here, L1 identifies the next cache in the memory hierarchy after the L0 cache. The L1 cache is searched for requested data not found in the L0 cache. Similarly, the L2 cache follows the L1 cache in the memory hierarchy. It is searched for requested data not found in either L0 or L1. Higher level caches may be present in some computer systems.

Caches tend to be larger the further they are from the CPU core, e.g. the higher their level in the memory hierarchy. The larger size accommodates the data held in any lower level cache(s) as well as additional data not available in lower level caches. The larger size of higher level caches increases the time required to access the data they store, because larger amounts of data must be sorted and more gates contribute to the capacitive loading of the cache circuitry.

Because the L0 cache is integrally coupled to the CPU core, data in the L0 cache is often addressed using the linear (logical) addressing scheme employed by the CPU core. However, data in higher level caches is typically addressed using a physical addressing scheme that reflects the structure of main memory. Consequently, data addresses must be translated from their linear to their physical address forms when the data is sought from higher level caches. Since address translation adds another step to the data retrieval process, high performance processors often include translation lookaside buffers (TLBs) for their higher level caches. A TLB stores recently translated physical addresses that are indexed according to portions (tags) of their corresponding linear addresses. If a linear address tag is present in the TLB, the data can be retrieved from the cache using the already-translated physical address tag associated with the linear address tag.

In addition to bits representing a linear address and a corresponding physical addresses, each TILB entry typically includes bits that indicate status information for the physical address. This information includes, for example, an indication as to whether the data is still valid, the memory type of the data, paging bits, and the like.

TLBs frequently are larger the larger the size of the cache they serve, since the TLB must hold correspondingly more entries. Larger TLBs have slower data access times for reasons similar to those for larger caches. In faster processors, valuable clock cycles may be consumed finding an entry in the TLB and retrieving the associated data. There is thus a need for a memory system that accommodates rapid address translation, especially for lower level caches.

SUMMARY OF THE INVENTION

The present invention provides fast access to cached data by speeding up the address translation process. A translation lookaside buffer (TLB) comprises truncated entries that reduce the size of the TLB, speeding up its operation. The TLB provides a portion of a tentative physical address that allows access to the cached data to be initiated earlier in the data access process. The data accessed with the tentative physical address data is later checked using a fully validated physical address.

In accordance with the present invention, a system for accessing cached data includes a first TLB that is coupled to receive a linear address for cached data, generate a portion of a tentative physical address for the data, and initiate access to the data using the tentative address portion. A second TLB coupled to the first TLB includes validity data to provide a validated physical address for the linear address. The validated physical address tag is used to confirm the tentative physical address with which the data access is initiated.

In one embodiment of the invention, an address generator provides the linear address in two portions on successive data clocks, and the first TLB begins translation when it receives the first address portion.

BRIEF DESCRIPTION OF THE FIGURES

The present invention may be understood with reference to the following drawings in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention.

However, those of ordinary skill in the art, having the benefit of this disclosure, will appreciate that the invention may be practiced without these specific details. Various well known methods, procedures, components, and circuits have not been described in detail in order to focus attention on the features of the present invention.

Figure 1:
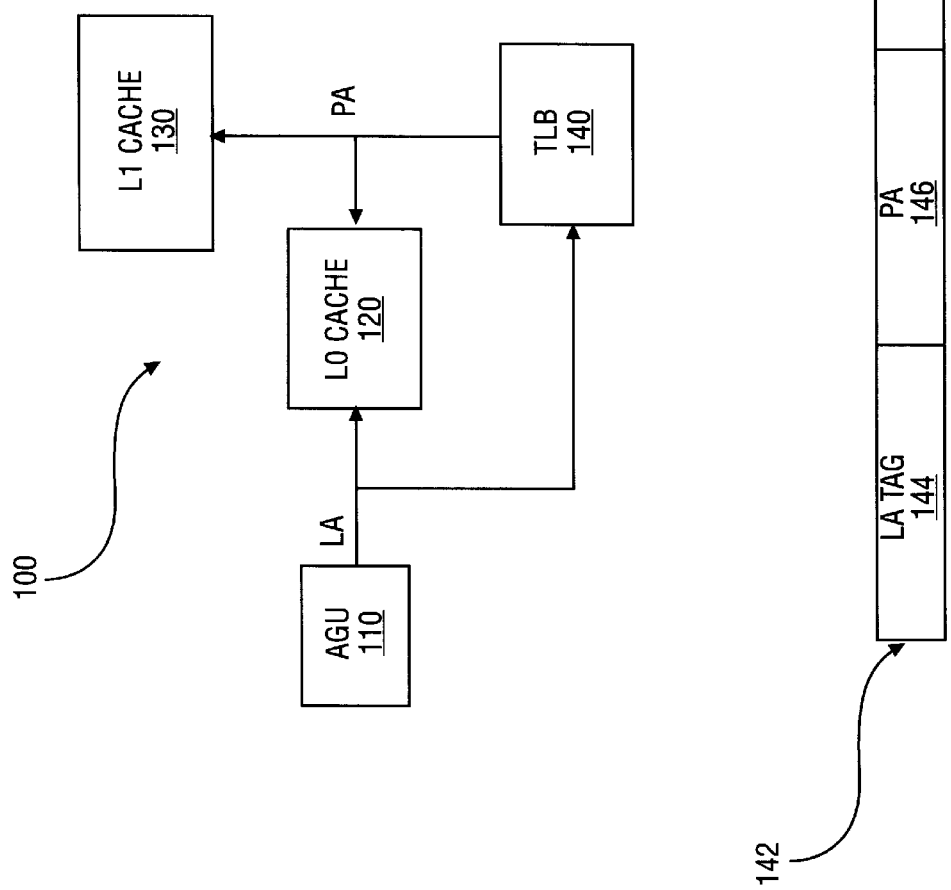
FIG. 1A is a block diagram of a conventional system for accessing cached data.
FIG. 1B is a block diagram of an entry in the TLB of FIG. 1A.

Referring first to FIG. 1A, there is shown a block diagram of a conventional system 100 for accessing cached data. System 100 comprises an address generator unit is (AGU) 110, a first cache 120, a second cache 130, and a translation lookaside buffer (TLB) 140. In typical configurations of system 100, cache 120 is a primary cache located on the processor chip, and cache 130 is a secondary cache that may be located either on or off the processor chip. AGU 110, which is located on the CPU chip, calculates a linear address (LA) of the data being sought by the CPU and provides the LA to cache 120 and TLB 140.

Cache 120 typically stores cached data in an entry that is indexed according to an untranslated segment of the data's address, e.g. address bits that are the same in the LA and the physical address (PA). This allows cache 120 to check for the presence of the data without first going through a translation step. Cache 130 typically stores data in an entry that is also indexed according to untranslated bits of the data's address. However, since cache 130 is larger than cache 120, the untranslated bits are often not sufficient to identify a unique entry in cache 130.

To speed the LA to PA translation necessary to access data in cache 130, system 100 includes TLB 140. Translation is accomplished via address translation entries in TLB 140 for the recently accessed data entries. Each entry includes a PA, indexed by a portion of its corresponding LA. If the LA (or portion thereof) misses in cache 120 and hits, i.e. matches an entry, in TLB 140, TLB 140 provides the corresponding PA for accessing the requested data in cache 130. If the LA misses in TLB 140, a hardware page walker or similar apparatus provides the PA necessary to access the data being sought. This last process is significantly slower than accesses that proceed via TLB 140.

Referring now to FIG. 1B, there is shown a block diagram of a typical entry 142 in TLB 140. Entry 142 is indexed according to a tag 144 derived from a portion of the LA for the corresponding data (LA tag). Associated with tag 144 is a data entry 146 representing the PA translation of the LA. Entry 142 also includes bits 148 that specify status information for the data pointed to by the PA. This status information includes, for example, whether the data is valid, the memory type of the data, and paging bits for the data. Status type data is typically checked when an LA generated by AGU 110 "hits", i.e. matches an entry, in TLB 140, to determine whether the data in cache 130 should be used. In this discussion, a PA determined by a TLB like TLB 140 that includes status information for the associated data is referred to as a validated PA. Entries 142 may be arranged in TLB 140 in a variety of configurations, depending on the access time required and the amount of logic budgeted for TLB 140. These issues are discussed below in greater detail.

The present invention improves access time for data stored in a cache by using a smaller, faster TLB (first TLB) in conjunction with a full-size TLB (second TLB) to translate addresses for the cache. Operation of the first and second TLBs overlap. The first TLB provides a rapid but tentative determination of the data's PA (tentative PA) for initiating access to the cached data. The second TLB determines a validated PA for the cached data sought, using known procedures that include a check of the status/validity of the PA entry. The validated PA provides a check on the tentative PA with which the data access is initiated. Unless otherwise indicated, "PA" refers to those bits of the PA that are necessary to access data in the cache.

Beginning the data access with the less reliable but more rapidly determined tentative PA from the first TLB allows cached data to be accessed faster in those cases where the first TLB's tentative PA is confirmed by the validated PA of the second TLB. In one embodiment of the invention, when the TLB results disagree, the PA entry in the first TLB is replaced with the validated PA provided by the second TLB, and the process is repeated. Other embodiments of the invention may employ different replacement schemes.

Figure 2:
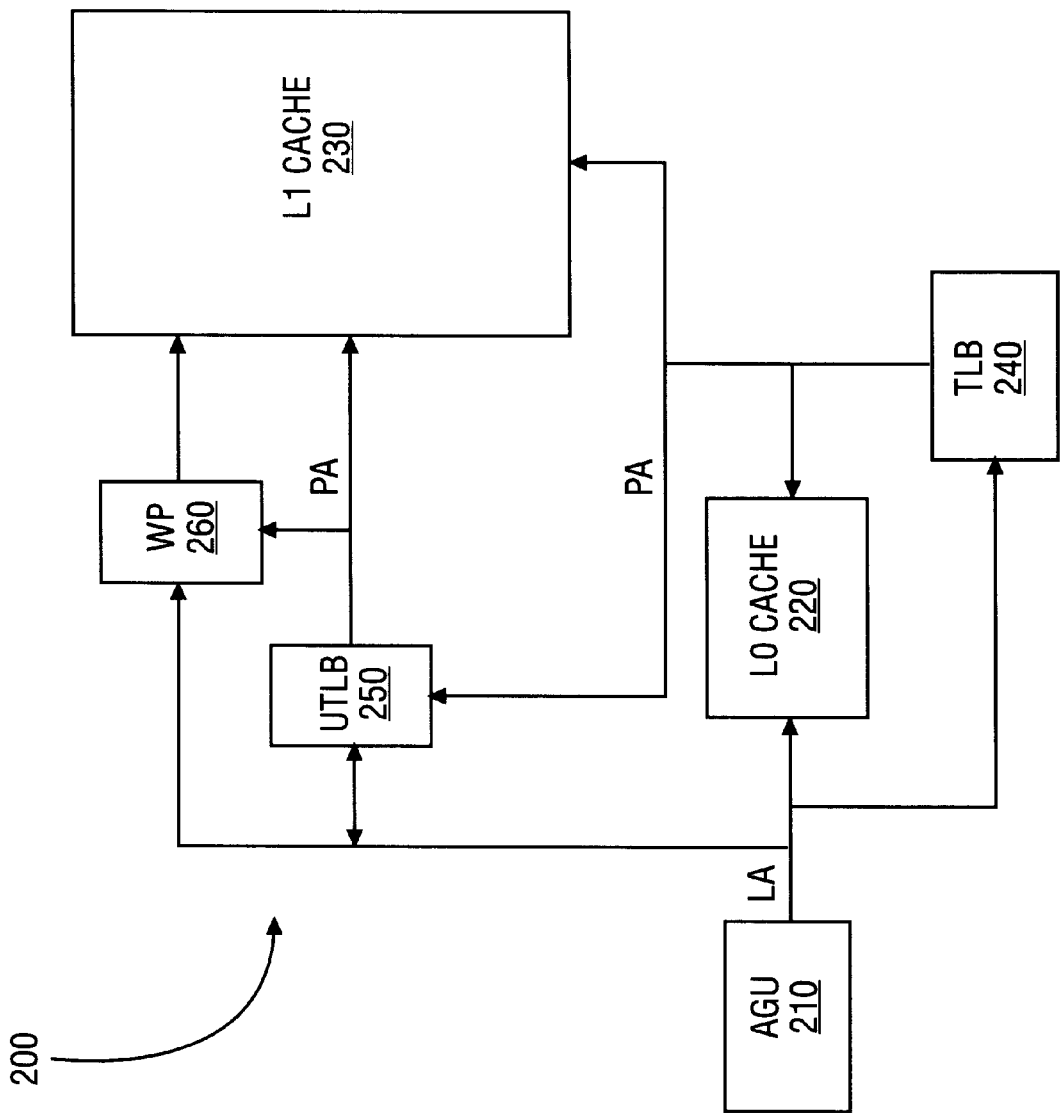
FIG. 2 is a block diagram of a system in accordance with the present invention for accessing cached data.

Referring now to FIG. 2, there is shown a memory subsystem 200 suitable for use with the present invention. Subsystem 200 includes an address generation unit (AGU) 210, a first cache 220, a second cache 230, a first (micro) TLB 250, and a second TLB (DTLB) 240. Also shown is a way predictor (WP) 260 which may be used advantageously with the present invention but is not required.

AGU 120 generates an LA, which is coupled to cache 220 and TLB 240 to determine if the data corresponding to the LA is available in cache 220 or 230, respectively. In addition, the LA is provided to first TLB 250. First TLB 250 is streamlined to determine a PA rapidly, when the LA hits in first TLB 250. In one embodiment, first TLB 250 is a single ported buffer that stores truncated address translation entries (FIG. 3A) for selected LAs. TLB 250 may be implemented as a single ported buffer because it need only be accessed for loads. These features reduce the size of first TLB 250 and speed its access time relative to second TLB 240.

In one embodiment, the entries of first TLB 250 are truncated by omitting status bits 148. In this case, checking circuitry may be omitted from first TLB 250, since it need not perform a validity check when an LA hits in TLB 250. In addition, first TLB 250 does not require an interface with a page miss handler unit (not shown), since misses may be handled through second TLB 240. The absence of these elements and a second buffer port as well as the use of truncated entries significantly reduces the size of first TLB 250 and allows it to generate a PA in response to an LA hit faster than second TLB 240.

The smaller size of TLB 250 allows designers greater flexibility in locating it on the processor die. In particular, its smaller size allows TLB 250 to be placed closer to cache 230 and AGU 210. This reduces the transit time of address signals to and from TLB 250, further speeding the data access process.

In one embodiment of system 200, AGU 110 generates each LA in two portions on sequential phases of a clock signal. In one embodiment of the present invention, first TLB 250 is configured to begin translation of an LA as soon as the first segment of the LA is received. Translation is completed when the second segment of the LA is received. For reasons discussed below, second TLB 240 is typically configured in a manner that requires receipt of both segments of the LA before translation can begin. The resulting "head start" available to first TLB 250 provides an additional speed margin for translations by first TLB 250 relative to those by second TLB 240.

WP 260 may be used to reduce the amount of data read out of cache 230 for the final compare. As discussed below, WP 260 uses untranslated bits of the data address in conjunction with translated address bits from first TLB 250 to isolate a way to be read out of cache 230. The way is then compared with the validated PA provided by second TLB
240. Where WP 260 is not employed, 8 ways are read out of
cache 230 for comparison with the validated PA, consuming
additional power. One embodiment of WP 260 includes a
series of multiplexers that are controlled by the indicated LA
and PA bits to isolate the way to be read out of cache 230.

WP 260 receives the data LA from AGU 110 and begins
a way identification process using untranslated address bits
of the LA. WP 260 also uses portions of the PA as they
become available from TLB 250 to complete the identification process. In one embodiment of system 200, WP 260
uses a portion(s) of the PA to identify a set in the tag array
of cache 230 that includes the location for the cached data.
The PA portion is compared with the set of locations (ways)
to identify the data location in cache 230 to be read out and
compared with the validated PA. Accordingly, the faster WP
260 receives the PA, the faster the cached data can be
accessed.

Figure 3A:
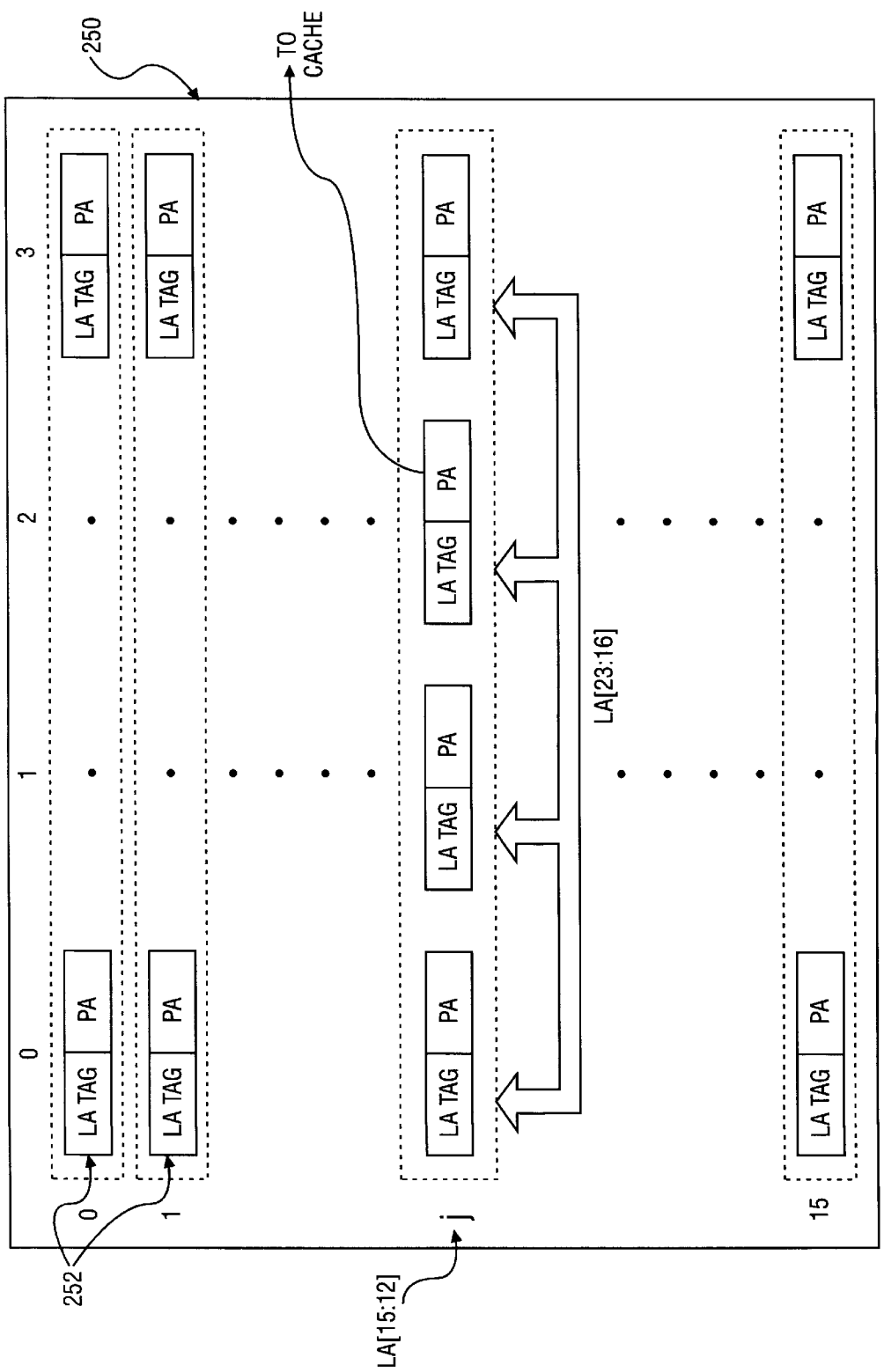
FIGS. 3A–3C are block diagrams of embodiments of first and second TLBs and a cache suitable for use in the present invention.

Referring now to FIG. 3A, there is shown an embodiment
of first TLB 250 suitable for a storing 64 address translation
entries. In the disclosed embodiment, entries 252 of TLB
250 have a set associative configuration comprising 4 ways
of 16 sets each. A first portion of an LA identifies one of the
16 sets (set j), and a second portion of the LA is compared
with the four entries (ways) of the identified set to determine
whether the LA hits in TLB 250. When an LA tag hits in
TLB 250, the PA in the entry is used to initiate access in
cache 230. If WP 260 is present, the PA entry is provided to
WP 260 which completes the decode process begun with the
LA tag.

In one embodiment of the invention, a 32 bit LA is sent
to first and second TLBs 250, 240 in sequential 16 bit
portions. In this embodiment, a four bit segment LA[15:12]
of the first portion of the LA identifies one of the 16 sets, e.g.
LA[15:12] is the set address (the sets are not distinguished
by the untranslated bits [11:0]). Also in this embodiment, an
eight bit segment LA[23:16] of the second portion of the LA
provides the tag that is compared with 8-bit values stored in
each way of the selected set. A 12 bit PA is included in each
entry 252. TIhus, each entry 252 of first TLB 250 is 20 bits,
and the total storage capacity of this embodiment of first
TLB 250 is 160 bytes.

Other embodiments of first TLB 250 may be configured
to operate using different numbers of LA bits and to provide
tentative PAs based on these bits. In general, TLB 250 may
use from 1 to N LA bits to generate a tentative PA, where N
is the total number of bits in the full tag. The number LA bits
used represents a tradeoff between the accuracy and speed of
first TLB 250. Fewer bits provide a tentative PA faster but
with less accuracy, while more bits provide the tentative PA
more slowly but with greater accuracy. In addition, first TLB
250 may provide different numbers of physical address bits
in the tentative PA, according to the size and configuration
of the associated cache. Alternative embodiments of first
TLB 250 may also be configured to include other than 64
entries, according to the needs of the system in which it is
employed. Similarly, the organization of first TLB 250 into
sets and ways may be selected according to the needs of the
system. Persons skilled in the art, having the benefit of this
disclosure, will recognize the modifications of the disclosed
embodiment necessary to implement these alternative
embodiments.

Figure 3B:
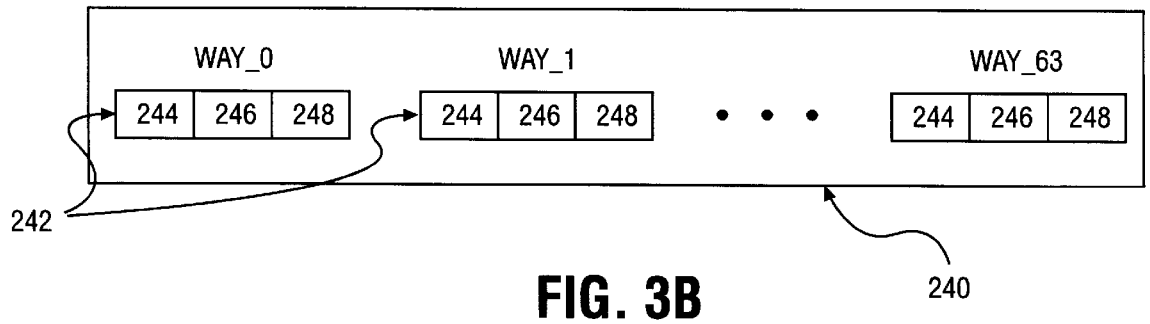

Referring now to FIG. 3B, there is represented an embodiment of second TLB 240 that is suitable for storing 64 tags.
In the disclosed embodiment, entries 242 of second TLB 240
are configured as 64 ways of 1 set each (fully associative).
Entries 242 are similar to those indicated in FIG. 1B for TLB
140. The fully associative structure of second TLB 240
allows all ways to be compared in parallel, but it is not
required for the present invention. For example, second TLB
240 may be organized into multiple sets of ways according
to the needs of the system. In the disclosed embodiment,
second TLB 240 includes a comparator for each way, logic
for checking the validity of each PA, separate read and write
ports, and status bits for each entry.

In one embodiment of TLB 240, an entry 242 includes a
20 bit LA tag 244, a 24 bit PA 246, and 9 bits of status
information 248. The size (53 bits) of entries 242 means that
TLB 240 must accommodate 424 bytes of data, a significant
size and capacitance increase relative to first TLB 24. In
addition, TLB 240 is preferably double ported to allow loads
and stores to proceed in parallel. The factors combine to
increase the access time necessary to process translation data
in TLB 240.

Figure 3C:
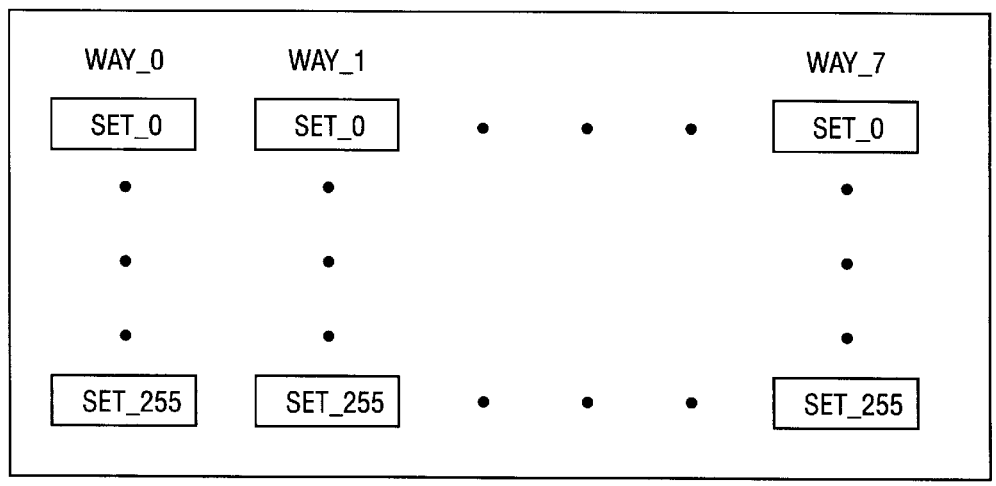

Referring now to FIG. 3C, there is represented an embodiment of a tag array for cache 230 suitable for use with WP
260 and first and second TLBs 250, 240, respectively. In the
disclosed embodiment, cache 230 comprises 256 sets of 8
ways each.

Where it is employed in the disclosed embodiment, WP
260 uses LA[11:7] (the untranslated bits) to reduce the 256
sets to 8 sets. When the PA is available from first TLB 250,
WP 260 uses a first portion of the PA to select one of the 8
sets. A second portion of the PA is compared with each of the
8 ways of the selected set to identify a candidate way to be
read out of cache 240 and compared with validated PA. As
noted above, by reducing the number of values read out of
cache 230, WP 260 reduces the power consumed in accessing data from cache 230.

Figure 4:
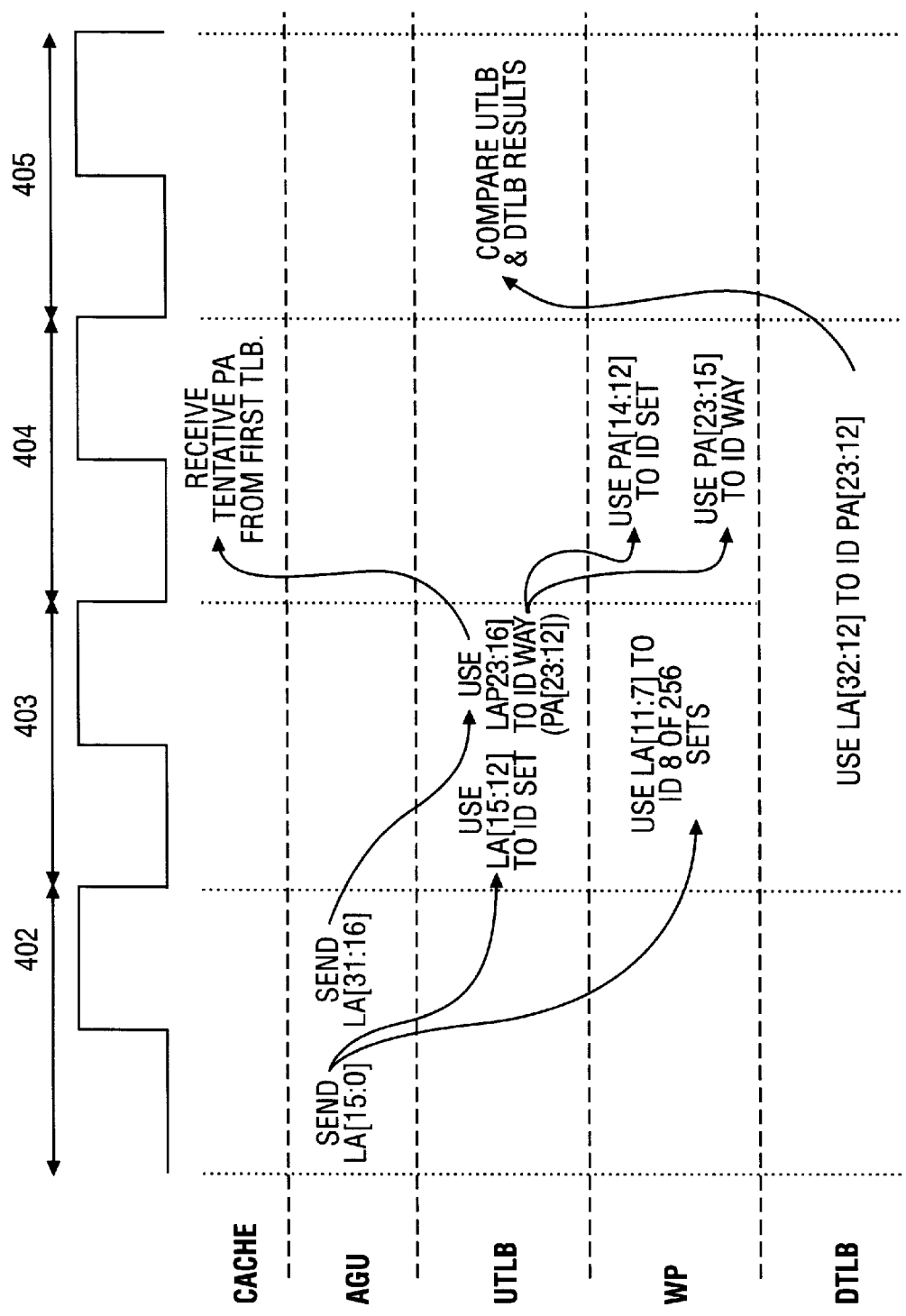
FIG. 4 is a timing diagram indicating operation of the data accessing system in accordance with the present invention.

Referring now to FIG. 4, there is shown a timing diagram
400 indicating operation of memory system 200 using the
embodiments of TLBs 240, 250, and cache 230 described
above. Operation of WP 260 is also indicated for those
embodiments that employ a way predictor, although this is
not required for the present invention. Persons skilled in the
art, having the benefit of this disclosure, will recognize
variations and modifications of these embodiments that may
be used to implement the present invention.

Timing diagram 400 is partitioned to indicate when events
occur in these devices for clock cycles 402, 403, 404, and
405. AGU 210 sends the first and second halves of LA
(LA[15:0], LA[31:16]) to TLBs 240, 250 and WP 260 in the
first and second halves of clock cycle 402. TLB 250 receives
LA[15:0] and LA[31:16] in the first and second halves of
clock cycle 403. Due to its configuration, first TLB 250
begins translation with a selected portion of LA[15:0] when
it is received. In the disclosed embodiment, this portion is
LA[15:12]. As noted above, TLB 240 uses portions of both
halves of the LA to initiate translation and consequently
does not begin its translation until the middle of clock cycle
403.

During the first half of clock cycle 403, TLB 250 uses
LA[15:12] to identify one of 16 possible sets in its 4 way-16
set configuration of entries, while the second portion of LA
(LA[31:16]) is in transit from AGU 110. LA[31:16] is
received approximately halfway through clock cycle 403.
TLB 250 uses the second portion of LA to determine
whether one of the tags in its 4 ways matches the LA tag
provided by AGU 210. If a match is identified, i.e. the LA
hits in TLB 250, the PA in the indexed entry is sent to cache
230 to initiate the look-up process. It is also sent to the way
predictor, if one is present.

Where WP 260 is employed, LA is sent to WP 260 as well in clock cycle 402. When LA is received in clock cycle 403, WP 260 uses selected bits from the first half of LA to identify a block of 8 of the 256 sets for each way of cache 230. WP 260 receives the PA from TLB 250 in clock cycle 404. WP 260 uses a first portion of the PA to identify one of the 8 sets for each way, and a second portion of the PA is used to identify one of the ways. Accordingly, the fast translation provided by TLB 250 allows WP 260 to identify the appropriate way to read out of cache 230, while TLB 240 completes its translation of LA. As noted above, the slower translation of TLB 240 follows from its larger size, which is necessary to accommodate a full set of status bits for each entry, logic for error checking, separate read/write ports, and comparator logic.

Because of its slower speed, TLB 240 provides validated PA to TLB 250 at clock cycle 405, where it is compared with the tentative PA generated by TLB 250 in the second half of clock cycle 403. If the PAs match, the data access begun in clock cycle 404 is allowed to complete, since the data being accessed is valid. If the tentative and validated PAs provided by TLBs 250 and 240, respectively, do not match, the data access is aborted, and an update process is initiated. Thus, for those loads for which the tentative PA provided by TLB 250 is correct, memory system 200 reduces access latency by a full clock cycle.

Figure 5:
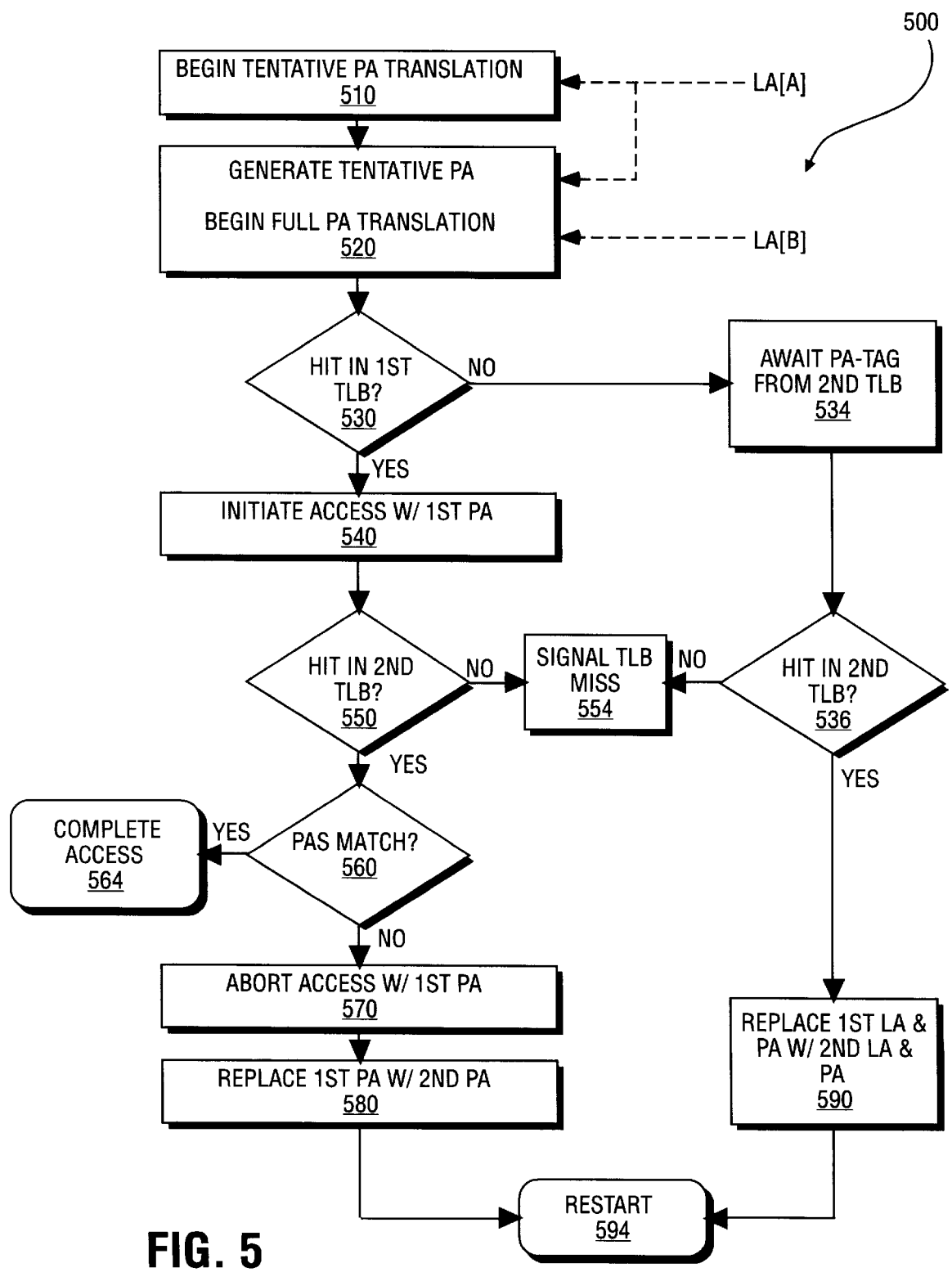
FIG. 5 is a flowchart showing a method for accessing cached data in accordance with the present invention.

Referring now to FIG. 5, there is shown a flowchart 500 summarizing the translation method implemented by memory system 200. At step 510, a first portion of the LA is received for processing by first TLB 250. The second portion of the LA is received at step 520, where it is used by TLB 250 to complete identification of a tentative PA. Also at step 520, TLB 240 begins a full translation of the received LA.

If the LA tag hits 530 on an entry in TLB 250, an access to the data in cache 230 is initiated 540 using the tentative PA from the TLB entry. Meanwhile, method 500 determines 550 whether the LA tag hits in second TLB 240. If the LA tag misses in TLB 240, a cache miss is signaled 554 (and the cache access initiated with the tentative PA is aborted). If the LA tag also hits in TLB 240, a validated PA provided by TLB 240 is compared with the tentative PA provided by TLB 250. If the PAs match 560, the access initiated with the with the tentative PA is allowed to complete 564. If the PAs do not match 560, the access initiated with the tentative PA is aborted 570. In this case, TLB 240 is updated 580 with the validated PA provided by TLB 250 and process 500 is repeated.

If the LA tag misses 530 in TLB 250, method 500 waits 534 for the result from TLB 240. If the LA tag also misses 536 in TLB 240, a cache miss is signaled 554. If the LA tag hits 536 in TLB 240, method 500 updates 590 TLB 250 with the LA and PA from TLB 240 and restarts 594 process 500.

Referring now to Table 1, there is summarized an update algorithm employed by first TLB 250 for various combinations of hits and misses in first and second TLBs 250, 240, respectively. In this table, $1^{st}$ TLB tag refers to the bits of the LA that index an entry 252 in first TLB 250, and $1^{st}$ TLB PA refers to the PA bits in an entry 252. Here, X means that the result is independent of the corresponding parameter, i.e. "don't care", and NA means that the operations does "not apply" under the circumstances.

TABLE 1

| $2^{nd}$ TLB HIT | $1^{st}$ TLB HIT | PA MATCH | UPDATE $1^{ST}$ TLB TAG | UPDATE $1^{st}$ TLB PA | ABORT ACCESS |
|---|---|---|---|---|---|
| NO | X | X | NO | NO | NA |
| YES | NO | X | YES | YES | YES |
| YES | YES | NO | NO | YES | YES |
| YES | YES | YES | NO | NO | NO |

There has thus been provided a system and method for speeding access to cached data. A pair of TLBs are accessed in parallel. One TLB includes a full complement of access tags, data, and status bits as well as separate ports for implementing loads and stores. The other TLB is streamlined by eliminating the status bits and one of the ports, and consequently provides a tentative PA faster. When an LA hits in the first TLB, access to the cached data is initiated using the tentative PA it provides, while the second TLB completes processing the LA tag. If the LA tag also hits in the second TLB, the associated PA is compared with the tentative PA used to initiate the data access. If the PAs match, the data access is completed using the tentative PA.

What is claimed is:

1. A system for accessing cached data comprising:
   an address generator, the address generator to provide first and second portions of a linear address for the cached data on first and second phases, respectively, of a clock cycle;
   a first translation lookaside buffer (TLB) coupled to the address generator, the first TLB including a plurality of address translation entries to determine a tentative physical address for the cached data according to the provided linear address; and
   a second TLB coupled to the address generator and the first TLB, the second TLB including a plurality of address translation entries each having associated validity data to determine a validated physical address for the cached data, the second TLB to provide the validated physical address to the first TLB to confirm the tentative physical address.

2. The system of claim 1, wherein the first TLB begins translating the linear address on receipt of the first portion of the linear address and the second TLB begins translating the linear address on receipt of the second portion of the linear address.

3. The system of claim 1, further including a way predictor coupled to receive the linear address and the tentative physical address, the way predictor to identify a set of cache addresses and a way from the set of cache addresses, using the linear address and the tentative physical address, respectively.

4. A system for accessing cached data indicated by a linear address, the system comprising:
   a first translation lookaside buffer (TLB) to initiate determining a tentative physical address for the cached data responsive to receipt of a first portion of the linear address on a first clock interval; and
   a second TLB to initiate determining a validated physical address for the cached data responsive to receipt of first and second portions of the linear address on first and second clock intervals, respectively, and to provide the validated physical address for comparison with the tentative physical address.

5. The system of claim 4, further comprising an address generator unit to provide the first and second portions of the linear address to the first TLB and the second TLB.

6. The system of claim 5, wherein the address generator unit provides the first and second portions of the linear address on first and second clock intervals and the first and second clock intervals are first and second phases of a clock cycle.

7. The system of claim 6, wherein the first TLB initiates an access to the cached data using the tentative physical address.

8. The system of claim 7, wherein the initiated access to the cached data is aborted when the tentative and validated physical address tags do not match.

9. The system of claim 8, wherein the tentative physical address in the first TLB is replaced with the validated physical address when the tentative and validated physical address tags do not match.

10. The system of claim 4, wherein the first TLB is a single ported TLB and includes a plurality of address translation entries, each entry having an associated physical address.

11. The system of claim 10, wherein the address translation entries of the first TLB are configured as a plurality of ways.

12. The system of claim 11, wherein the address translation entries of the first TLB have a four way set associative configuration.

13. The system of claim 4, wherein the second TLB includes a plurality of address translation entries, each entry having an associated physical address and validity data.

14. The system of claim 13, wherein the address translation entries of the second TLB have a fully associative configuration.

15. A method for providing rapid access to cached data specified by a linear address, the method comprising:
    storing a first set of translation entries in a first buffer;
    storing a second set of translation entries in a second buffer;
    determining a tentative physical address from the first set of translation entries on receipt of a linear address and initiating access to the cached data using the tentative physical address;
    determining a validated physical address from the second set of translation entries on receipt of the linear address and comparing the tentative physical address with the validated physical address.

16. The method of claim 15, further comprising allowing the initiated access to complete when the validated and tentative physical addresses match.

17. The method of claim 16, further comprising aborting access to the cached data using the tentative physical address when the tentative and validated physical addresses do not match.

18. The method of claim 17, further comprising accessing the cached data using the validated physical address tag when the tentative and validated physical addresses do not match.

19. The method of claim 18, wherein the cached data using the validated physical address comprises:
    replacing the tentative physical address in the first set of translations with the validated physical address; and
    repeating the access.

20. The method of claim 15, wherein storing the second set of translation entries comprises storing a set of physical address translations and associated validity bits.

21. The method of claim 20, wherein storing the first set of translation entries comprises storing a set of physical address translations without the associated validity bits.

22. The method of claim 15, wherein storing the first set of translation entries comprises storing a set of truncated translation entries.

23. The method of claim 22, wherein storing the second set of translation entries comprises storing a set of complete translation entries, including validity bits.

24. A memory system comprising:
    a first translation buffer to store a first set of translation entries, the first set of translation entries being truncated to provide a tentative physical address with a first latency; and
    a second translation buffer to store a second set of translation entries, including associated validity bits, to provide a validated physical address with a second latency that is longer than the first latency.

25. The memory system of claim 24, further comprising a cache and wherein the first translation buffer initiates an access to the cache using the tentative physical address.

26. The memory system of claim 25, wherein the access is aborted if the validated physical address and the tentative physical address do not match and a new access is initiated using the validated physical address.

27. The memory system of claim 24, further comprising an address generation unit, the address generation unit to provide first and second portions of a linear address to the first translation buffer during first and second clock intervals.

28. The memory system of claim 27, wherein the first translation buffer initiates a determination of the tentative physical address responsive to receipt of the first portion of the linear address.

29. The memory system of claim 28, wherein the second translation buffer initiates a determination of the tentative physical address responsive to receipt of the first and second portions of the linear address.

* * * * *

UNITED STATES PATENT AND TRADEMARK OFFICE
CERTIFICATE OF CORRECTION

PATENT NO.    : 6,138,225
DATED         : October 24, 2000
INVENTOR(S)   : Upton et al.

It is certified that error appears in the above-identified patent and that said Letters Patent is hereby corrected as shown below:

<u>Column 3,</u>
Line 9, after "unit", delete "is".

<u>Column 5,</u>
Line 40, delete "TIhus", insert -- Thus --.

Signed and Sealed this

Eighteenth Day of June, 2002

Attest:

Attesting Officer

JAMES E. ROGAN
*Director of the United States Patent and Trademark Office*